United States Patent [19]

Ingvason

[11] Patent Number: 4,550,673
[45] Date of Patent: Nov. 5, 1985

[54] HULL CONSTRUCTION FOR SEAGOING VESSELS

[76] Inventor: Sigurdur Ingvason, Gördesvagen 31, 43080 Hovås, Sweden

[21] Appl. No.: 500,359

[22] Filed: Jun. 2, 1983

[51] Int. Cl.$^4$ ............................. B63B 1/06; B63B 1/08
[52] U.S. Cl. ........................................ 114/56; 114/57; 440/66; 440/67; 440/79
[58] Field of Search .................. 114/56, 57, 61, 288; 440/66, 67, 69, 75, 79

[56] References Cited

U.S. PATENT DOCUMENTS

| | | | |
|---|---|---|---|
| 2,729,182 | 1/1956 | Tommasi | 114/57 |
| 3,105,454 | 10/1963 | Baldwin | 440/75 |
| 3,455,263 | 7/1969 | Nönnecke | 114/57 |
| 3,481,295 | 12/1969 | Campbell et al. | 114/57 |
| 3,565,029 | 2/1971 | Smit | 114/57 |
| 4,002,132 | 1/1977 | Nitzki | 114/61 |

FOREIGN PATENT DOCUMENTS 2655734  6/1978  Fed. Rep. of Germany ........ 114/56

Primary Examiner—Sherman D. Basinger
Attorney, Agent, or Firm—Burns, Doane, Swecker & Mathis

[57] ABSTRACT

A seagoing vessel comprises a hull having a forwardly projecting bulb at its bow. The bulb includes an upper periphery oriented substantially horizontally and exposed above the water surface when the vessel is stationary and in a fully loaded condition. A pair of side skegs extend rearwardly from an underside of the vessel at the stern end. Propeller shafts extend through the side skegs. The side skegs and propeller shafts converge in a rearward direction. Each side skeg includes a planar outboard surface and a bulbous inboard surface, the latter inducing an outboard flow of water through a top segment of the associated propeller in a direction opposite the direction of propeller rotation. A center skeg extends between the side skeg and includes downwardly converging and rearwardly diverging sides which induce an outboard flow of water through a top segment of a respective propeller in a direction opposite the direction of propeller rotation. Each side skeg defines a H-shape beam structure upon which are mounted the engine, transmission, and support bearings for a respective propeller shaft.

23 Claims, 9 Drawing Figures

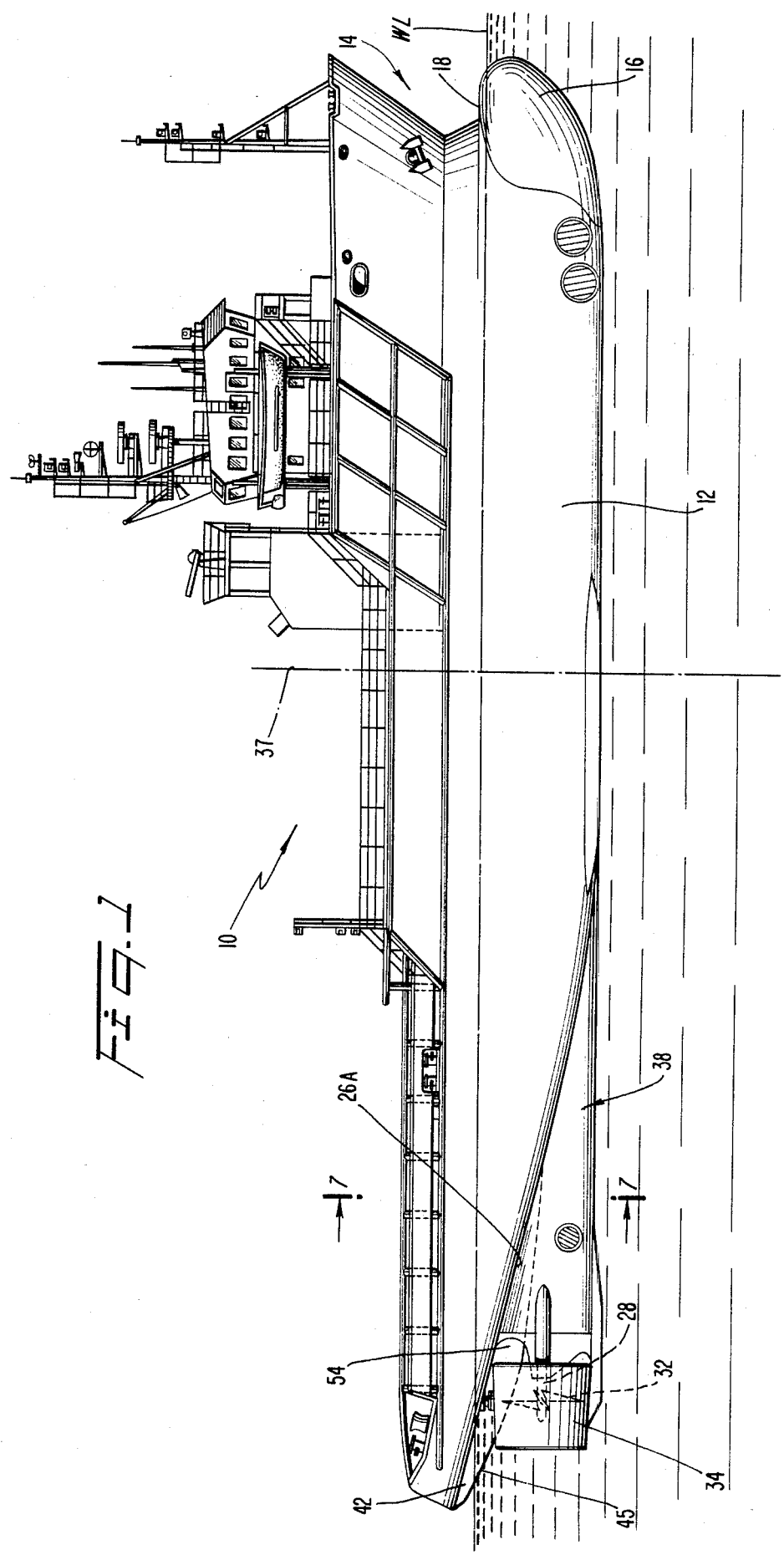

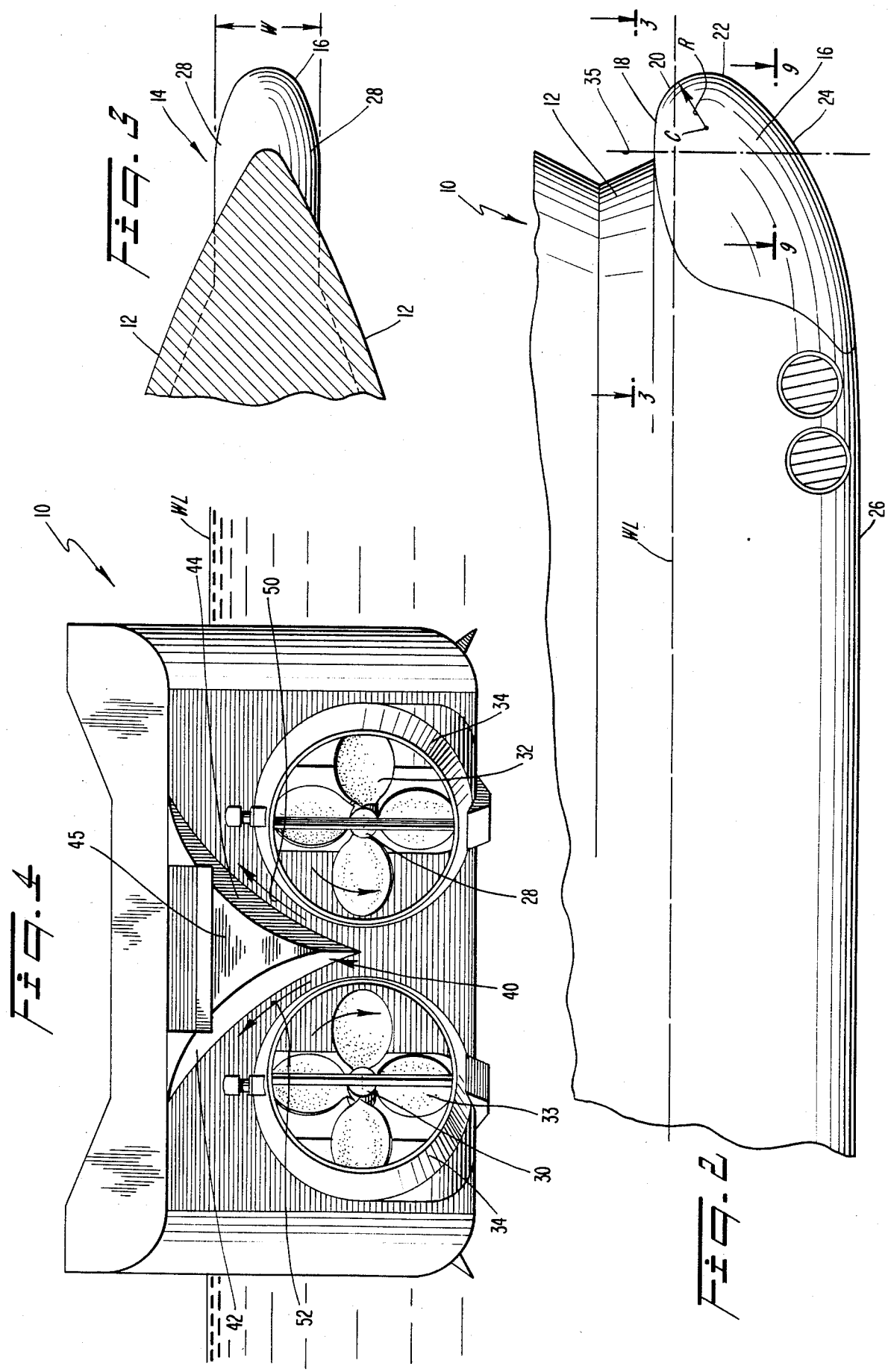

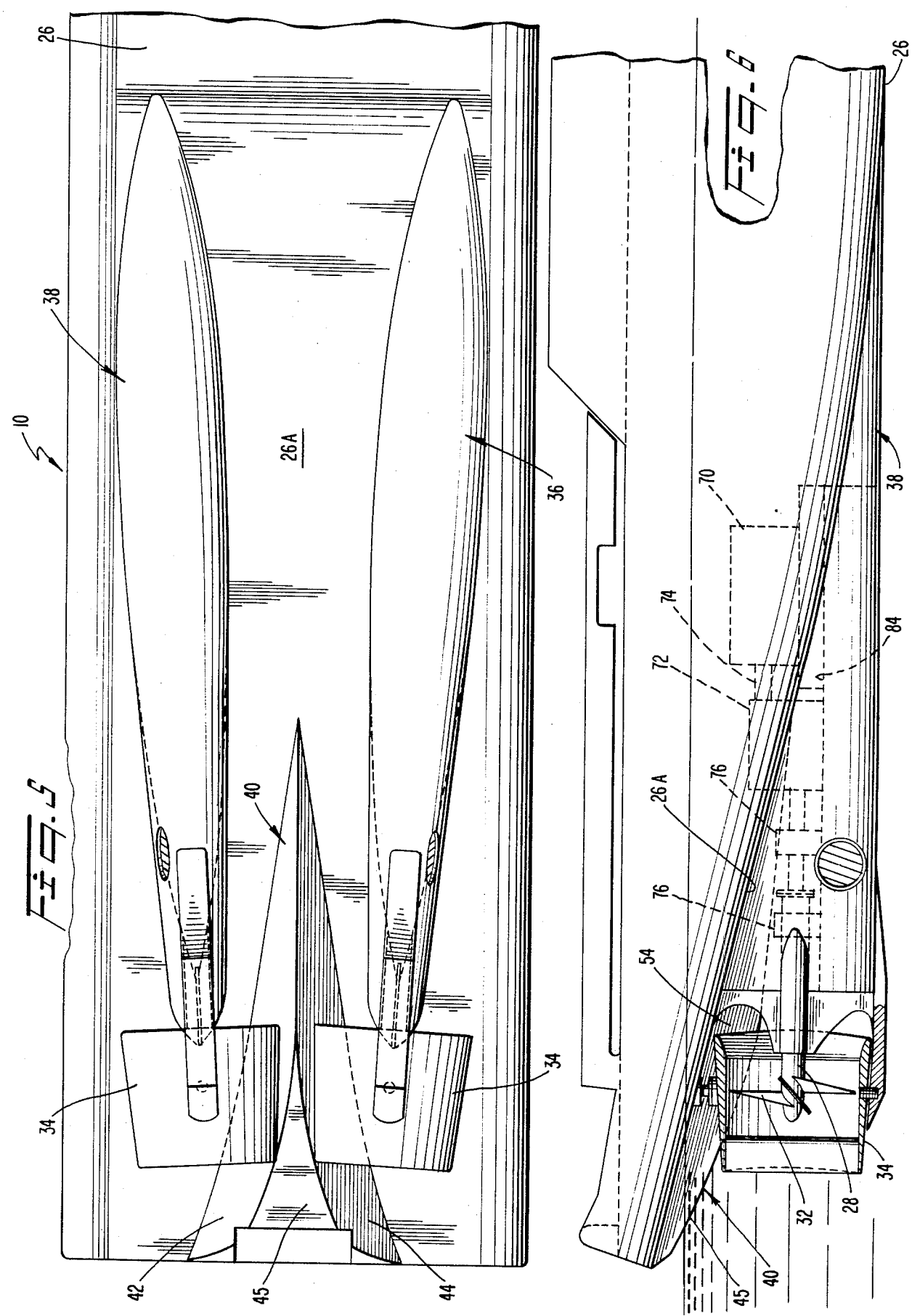

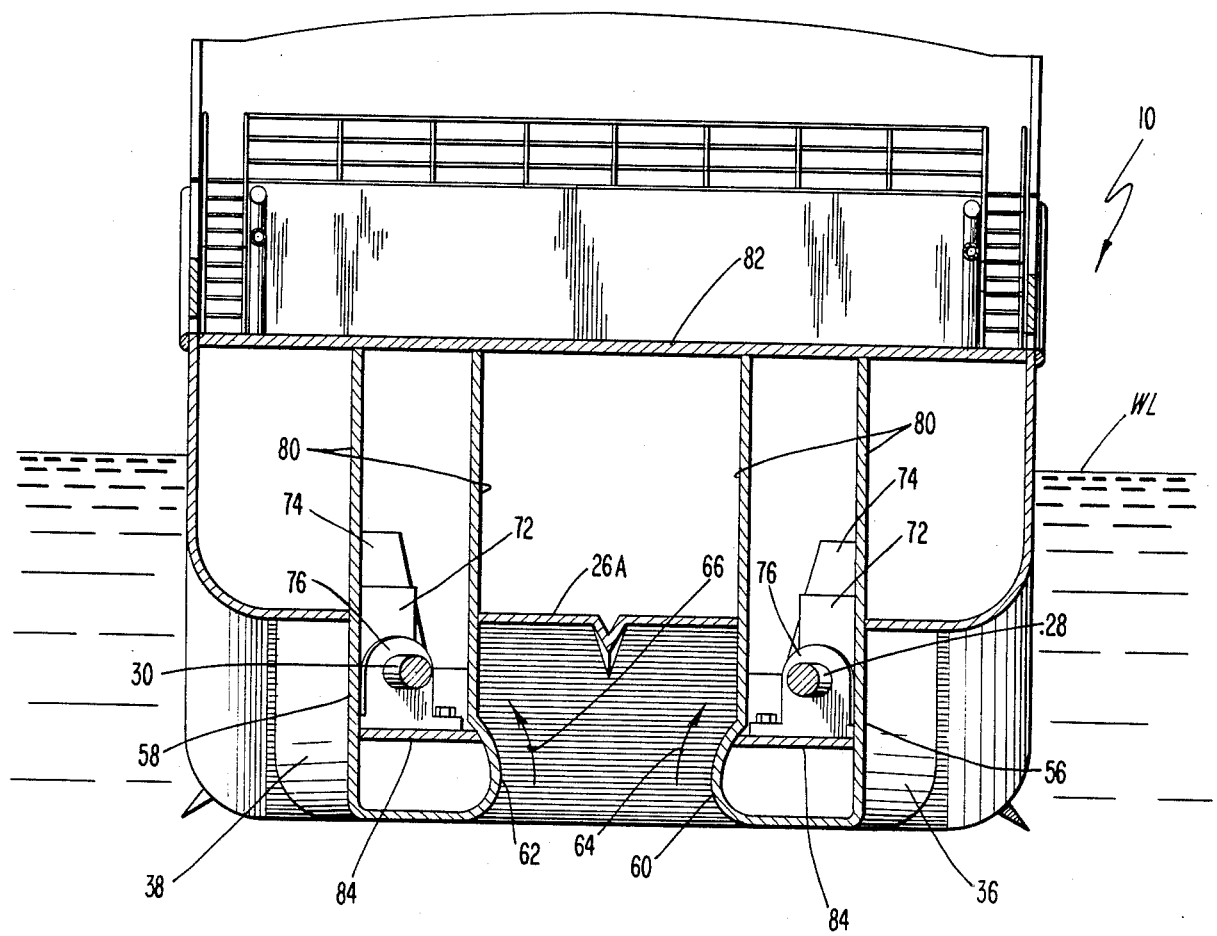
Fig. 7
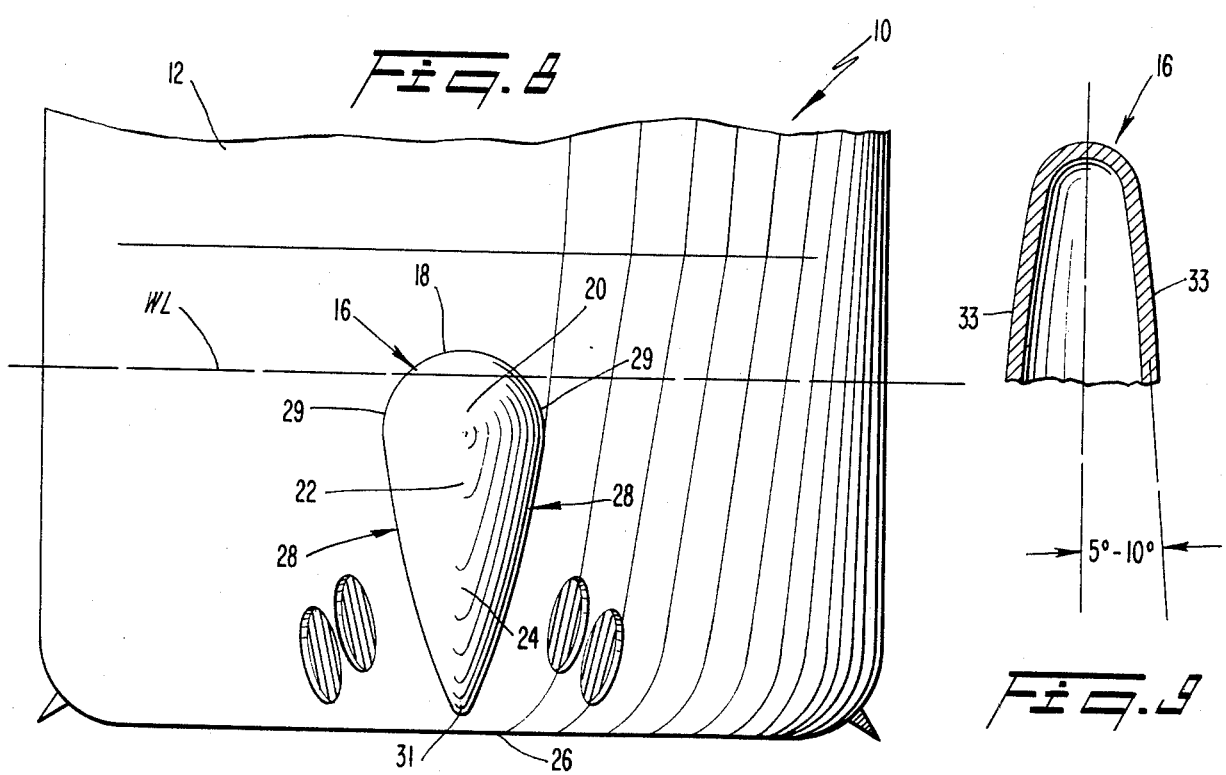
Fig. 8
Fig. 9

HULL CONSTRUCTION FOR SEAGOING VESSELS

BACKGROUND AND OBJECTS OF THE INVENTION

The present invention relates to seagoing vessels and, in particular, to a hull construction which increases the propulsion efficiency of such vessels.

Among the goals sought to be reached in the design of large boats, such as support vessels for offshore petroleum operations for example, is the maximization of propulsion efficiency in order to reduce fuel costs and increase the bollard pull. One factor having major impact upon propulsion efficiency is the configuration of the hull of the vessel. A typical hull includes a bow formed by side walls which diverge rearwardly and eventually assume a generally parallel relationship. It is conventional to provide a bulb at the bow to reduce hull resistance during a ballasted condition of the ship (e.g., see Taylor et al. U.S. Pat. No. 3,946,687 issued Mar. 30, 1976 and Weicker U.S. Pat. No. 3,455,262 issued July 15, 1969). The transition regions in which the rearwardly diverging portions of the side walls assume a generally parallel relationship occur at some distance aft of the bow and may be considered to form "shoulders", the presence of which creates turbulence as the vessel advances through the water. Such turbulence increases hull resistance and reduces the propulsion efficiency of the ship. The amount of turbulence which is created is a function of the abruptness of the transition zone, i.e., a more abrupt transition zone produces more turbulence than a gradual or streamlined transition zone. On the other hand, a highly streamlined transition zone results in a blunted bow shape, which shape produces more turbulence at the bow than does a pointed bow shape.

Therefore, the design of a bow to enhance propulsion efficiency involves mutually conflicting considerations which necessitate that compromises be made.

The hull design at the stern can also significantly affect the propulsion efficiency. For example, by inclining the underside of the hull rearwardly upwardly at the stern, the wake produced by the ship can be reduced, thereby lessening the amount of hull resistance. However, such an inclining of the hull underside can adversely affect the propeller performance. That is, it is desirable to maximize the water velocity traveling to the propellers in order to enhance the propeller efficiency. By inclining the underside of the hull at the stern, however, the water approaching the propellers encounters a gradually increasing area and can undergo a considerable loss of velocity.

With further regard to the propellers, it is noted that the propeller shafts are often encased within skegs or housings which diverge rearwardly from the backside of the hull. The presence of such skegs can influence the water flowing toward the propellers, e.g., by creating efficiency-robbing turbulence, in such manner as to reduce the propeller performance and create vibrations in the propeller.

Another factor which can adversely affect propeller performance is propeller vibration induced by turbulence and/or instability of the engine and propeller shaft bearings, which phenomena can occur to some extent in vessels. For example, vibrations in the propeller shaft can be caused by relative flexing between various parts of the hull. That is, it is common to mount the engine upon one section of the hull, and the propeller shaft suport bearings on another section. Although the hull is typically formed of steel, it is subject to flexing during vessel travel. As a result, the propeller shaft, engine and bearings can experience relative displacements, whereby undesirable stresses are imposed on the propeller shaft that can lead to damage of the bearings and excessive vibration of the propeller shaft.

It is, therefore, an object of the present invention to minimize or obviate problems of the types discussed above.

A further object of the invention is to increase fuel efficiency and pull capacity.

Another object is to minimize the amount of turbulence created at the bow and transition zones of the hull of a seagoing vessel.

An additional object of the invention is to maximize the propeller performance of a multi-propeller vessel.

A further object of the invention is to optimize the behavior of water flowing to the propellers from the standpoint of propeller efficiency.

Yet another object of the invention is to minimize vibrations occurring in the propeller, propeller shaft, and engine.

A further object is to stabilize the engine and propeller shaft against flexing movements of the hull.

SUMMARY OF THE INVENTION

These objects are achieved in accordance with the present invention which involves a seagoing vessel comprising a hull having side walls which converge forwardly to define a bow. A forwardly projecting bulb is disposed at the bow. The bulb includes an upper periphery oriented substantially horizontally and exposed above the water surface when the vessel is in a fully loaded condition. Preferably, the bulb is exposed to a height of about 1.5 feet above the water surface when the vessel is stationary and in a fully loaded condition.

Preferably, a portion of the underside of the hull is inclined upwardly and rearwardly at the stern end of the vessel, and a pair of side skegs extend rearwardly from the inclined portion on opposite sides of a fore-aft center axis of the vessel. A pair of propeller shafts extend through respective side skegs and carry propellers at their rearward ends. The side skegs and propeller shafts converge in the rearward direction.

Preferably, the side skegs each include an outboard surface and an inboard surface, wherein the outboard surface is generally planar, and the inboard surface includes an inboard projecting convex bulge at its lower end for inducing an outboard flow of water through a top segment of the associated propeller preferably in the direction opposite the direction of propeller rotation.

Preferably, a center skeg extends rearwardly from the inclined portion of the underside in a fore-aft direction midway between the side skegs. The center skeg overlaps longitudinally with at least rear portions of the side skegs. The center skeg includes downwardly converging and rearwardly diverging sides which each induce an outboard flow of water through a top segment of a respective propeller preferably in a direction opposite the direction of propeller rotation.

Preferably, each side skeg comprises horizontally spaced, upright steel plates extending upwardly beyond the underside of the hull. At least a portion of each plate extends substantially to a deck of the vessel. Horizontal steel cross-plating rigidly interconnects the upright plates intermediate the height of the skeg. Mounted on the cross-plating are the engine, transmission, and propeller shaft bearings.

THE DRAWING

The objects and advantages of the invention will become apparent from the following detailed description of a preferred embodiment thereof, in connection with the accompanying drawings in which like numerals designate like elements, and in which:

FIG. 1 is a side elevational view of a seagoing vessel according to the present invention in a fully loaded condition;

FIG. 2 is a fragmentary side elevational view of a lower bow portion of the vessel according to the present invention;

FIG. 3 is a cross-sectional view taken along a horizontal reference line 3—3 in FIG. 2; depicting a bow bulb in plan view;

FIG. 4 is a rear elevational view of the vessel;

FIG. 5 is a bottom plan view of the stern end of the vessel;

FIG. 6 is a side elevational view of a stern end of the vessel;

FIG. 7 is a cross-sectional view taken through the hull along line 7—7 in FIG. 1, depicting the cross-sectional configuration of the side skegs;

FIG. 8 is a front view of the bulbous bow of the vessel; and

FIG. 9 is a cross-sectional view of the bulb taken along a horizontal reference line 9—9 in FIG. 2.

DETAILED DESCRIPTION OF A PREFERRED EMBODIMENT OF THE INVENTION

Depicted in FIG. 1 is a seagoing vessel such as a support boat 10 for offshore petroleum operations, for example. The hull includes side walls 12 which converge forwardly toward a bulbous bow 14 (FIG. 3). The side walls are of a streamlined nature in their transition from a parallel to a converging relationship such as to form a relatively bluntly shaped bow 14. In order to minimize the considerable turbulence which might otherwise result from such a bow shape, the bulb 16 according to the present invention includes an upper periphery 18 which extends substantially horizontally, i.e., parallel to the water surface as viewed from the side (FIG. 2), and is arranged to lie above the water level WL when the vessel is stationary and fully loaded.

The bulb upper periphery extends horizontally or diverges from horizontal by no more than ±5 degrees, and is situated at least about 1.5 feet above the water level WL with the vessel fully loaded and stationary.

The bulb upper periphery 18 extends forwardly and merges with a forwardly and downwardly curving section 20 of the bulb. The latter section 20 continues to curve forwardly and downwardly below the water surface WL until reaching the bulb frontmost portion 22, the latter being situated substantially above the midpoint of the maximum height of the bulb. From the bulb front 22, the bulb curves downwardly and rearwardly at 24 to the underside 26 of the hull. The bulb sides 28 curve downwardly and outwardly to a maximum width below the water surface at 29 and then curve downwardly and inwardly toward a bottom point 31. The maximum width extends from the rear end of the bulb to a location adjacent a front end of the bulb.

The upper portions of the sides 28 are mutually parallel, as can be seen in FIG. 3. The lower portions 33 of the sides 28 are generally convergent rearwardly as can be seen in FIG. 9. Preferably, the diverging side portions each form an angle of from 5 to 10 degrees relative the fore-aft center line 33A of the vessel. The bow of the vessel extends downwardly and rearwardly from a deck of the vessel to a location above the bulb and extends forwardly and downwardly to the rear end of the bulb, as can be seen in FIG. 2.

By disposing a horizontal or substantially horizontal upper periphery of a bulb above the water surface when the vessel is fully loaded and stationary, oncoming water is lifted and parted sidewardly by the bulb before making full impact with the bow. Consequently, the water flows past the bow with less turbulence than would otherwise occur in the case of a bulb which is submerged, whereby the amount of hull resistance is greatly reduced.

As an emperical example, an offshore supply boat having an overall length of 225 feet, a draft service of 18.5 feet, a displacement A.B.T. of 3375 M.T.; and a deadweight A.B.T. of 1875 M.T. could be provided with a bulb having the following characteristics:

width W: 9.5 feet
radius R: 5.0 feet
maximum height H: 20.0 feet
radius point C and bulb front 22 disposed 15 feet above baseline BL Preferably, the maximum cross-sectional area of the bulb (i.e., taken along vertical reference line 35 in FIG. 2) is between 10 to 12% of the maximum midbody area of the vessel. The "maximum midbody area" can be seen by taking a vertical cross-section through the vessel along reference line 37 in FIG. 1 and then considering the area thereof disposed below the water level. In a vessel of the type described above, a typical maximum midbody area generally comprises a rectangle which is 45 feet by 18.5 feet.

Referring now to the stern of the vessel, the underside 26 slopes upwardly and rearwardly at 26A at the stern in conventional fashion (FIG. 6) in order to minimize vessel drag. Projecting rearwardly are two propeller shafts 28, 30 which carry propellers 32, 33, respectively, at their rear ends. A conventional Kort nozzle 34 can be provided for each propeller, if desired. The propeller shafts 28, 30 extend within respective side skegs 36, 38 that project from the underside of the vessel.

In accordance with the present invention, the side skegs 36, 38 are convergent in a rearward direction (see FIG. 5), and a center skeg 40 extends in a fore-aft longitudinal direction intermediate the side skegs. The center skeg 40 longitudinally overlaps the side skegs 36, 38 and includes a pair of downwardly convergent, rearwardly divergent side walls 42, 44 (FIG. 4). The center skeg is somewhat truncated at its rearmost end 45. The bottom of the skeg 40 is situated higher than the propeller shafts in a region where the center skeg traverses a vertical plane containing the propellers, as can be seen in FIG. 6.

As a result of the rearwardly convergent nature of the side skegs 36, 38, the tendency for water to decelerate as it approaches the inner half segments of the propellers is reduced. That is, water approaches the inner half segment of each propeller (i.e., as viewed in FIG. 4, the "inner half segment" is defined by the 6 o'clock to 12 o'clock segment of the right-hand propeller 32, and by the 12 o'clock to 6 o'clock segment of the left-hand propeller 33) along a channel defined by (i) the side skegs 36, 38, (ii) the underside 26A of the vessel, and (iii) to some extent the center skeg 40. The sloping nature of the underside of the vessel tends, in and of itself, to increase the cross-sectional area of that channel as the propellers are approached. This would tend, in and of itself, to produce a deceleration of the water approaching the propellers. However, the rearwardly convergent nature of the side skegs tends, in and of itself, to reduce the cross-sectional area of the channel, thereby compensating for much of the increase in cross-sectional area caused by the sloping nature of the underside 26.

Hence, the resultant deceleration of the water flow within the channel which would otherwise result from the sloping nature of the underside 26 is at least significantly compensated for. It will be appreciated that the work output or performance of the propeller is a function of the velocity and quantity of the water encountered. Thus, by maintaining a high water velocity and flow, a significant drop in performance is prevented, and propeller vibration is minimized.

It is to be understood that the center skeg 40 actually extends adjacent to only the upper portion of the channel and thus influences the flow of water to only the upper section of the inner half segment of each propeller, i.e., approximately the 9 o'clock to 12 o'clock segment of the right-hand propeller 32 in FIG. 4, and the 12 o'clock to 3 o'clock segment of the left-hand propeller 33. The center skeg occupies volume that would otherwise be occupied by water, and thus reduces the cross-sectional area of the channel along which water flows toward the upper sections of the propellers. The converging side skegs, on the other hand, serve to maintain a high water velocity of the upper and lower sections of the inner half segment of each propeller.

The presence of the center skeg 40 also contributes to an increased quantity of water which encounters the top segments of the propellers, e.g., approximately the 10 o'clock to 2 o'clock segment of each propeller. That is, the downwardly convergent side walls 42, 44 impart an outboard direction of travel to the water that passes through the top segments of the propellers, which direction is in opposition to the rotation of the propellers. In other words, as viewed in FIG. 4, the side wall 44 directs the water in a clockwise direction 50 relative to the counterclockwise-moving, right-hand propeller 32, and the side wall 42 directs water in a counterclockwise direction 52 relative to the clockwise-moving, left-hand propeller 33. This counter-directional relationship between the water flows and the propellers occurs in the region 54 (FIG. 6) where the water enters the Kort nozzle and increases the quantity of water which passes through the top segments of the propellers and thus increases the work output performed by the outer ends of the propeller blades along the top segments of the propellers. Traditionally, the work output performed by the top segments of the propellers has bee low, due to a lack of ample water flow therethrough.

Furthermore, since this flow of water induced by the center skeg travels in a direction 50 which is opposite the direction of rotation of the propeller, the water velocity seen by the propeller blades is greater, thereby further increasing the work output of the propeller.

The height (i.e., the vertically downward dimension) of the center skeg 40 progressively increases in the rearward direction and is preferably maximum in the region of the propellers. It is also preferable that each side wall 42, 44 be spaced from the associated propeller by a distance approximately equal to 20% to 25% of the diameter of the propeller and be oriented at an angle of about 45 degrees relative to vertical as viewed in FIG. 4.

The side skegs 36, 38 are, in accordance with the present invention, configured in cross-section in a manner producing an increase in water resistance along the top segments of the propellers. That is, as can be seen in FIG. 7, the side skegs 36, 38 include outboard surfaces 56, 58 and inboard surfaces 60, 62. The outboard surfaces 56, 58 are generally planar, while the inboard surfaces 60, 62 are bulbous, i.e., includes a convex bulge projecting inboard. This bulbous configuration extends to the rear ends of the side skegs. As a result, the bulbous surfaces 60, 62 each tend to produce an outboard flow of water, i.e., a flow in the clockwise direction 64 at the right-hand side skeg 36 (FIG. 7) and in a counterclockwise direction 66 at the left-hand side skeg 38. Such water flows occur across the tops of the side skegs in the region 54 and are in opposition to the direction of rotation of the associated propeller. Thus, the quantity of water delivered to the top segments of the propellers is increased, thereby increasing the work output of the propeller in that region.

Furthermore, since the flow of water induced by each bulbous surface travels in a direction 64 opposite the direction of propeller rotation, the water velocity seen by the propeller blades is greater, thereby further increasing the work output of the propeller.

It should be noted that the outboard water flows 64, 66 created by the bulbous surfaces 60, 62 are disposed radially inwardly of the outboard water flows 50, 52 created by the side walls 44, 42 of the center skeg 40, with respect to the propeller axis. Thus, the water flows 64, 66 act upon portions of the propeller blade which are located radially inwardly of those portions of the blades influenced by the water flows 50, 52.

To summarize, the intensity of water resistance encountered by the propellers is intensified by the following features in accordance with the present invention:

(i) rearward convergence of the side skegs which reduces the cross-sectional area of water channel;

(ii) presence of center skeg which further reduces the cross-sectional area of the water channel;

(iii) downward convergence of the side walls 42, 44 of the center skeg which produce outboard water flows 50, 52; and (iv) bulbous configuration of the inboard surfaces of the side skegs which produces the outboard water flows 64, 66.

The propeller shafts are each driven by means of an engine 70 and a transmission 72 which are interconnected by a drive shaft 74. A plurality of bearings 76 rotatably support each propeller shaft. As noted earlier, it has been a problem heretofore in the art for damage to occur to the bearings and/or for vibrations to be induced in the propeller shafts as the result of relative displacements which occur between different parts of the hull, i.e., as the hull flexes during travel of the vessel.

In accordance with the present invention, however, a rigidified structure is created upon which are mounted the engine, transmission and bearings, and which is resistant to the traditional flexing actions.

As can be seen in FIG. 7, the side walls of the side skegs are joined to upstanding steel plates 80, at least rear portions of which extend to the deck 82 of the vessel. Front portions of the plates may extend to less height so as to form a stepped-down relationship in the fore direction of the vessel.

Interconnecting each associated pair of upright plates is a steel cross-plate 84 which is welded to the upright plates 80 intermediate their heights to form therewith a rigidified structure. Mounted on the cross-plate are the endine 70, transmission 72, and propeller shaft bearings 76.

It will be appreciated that the upright plating and cross-plating forms a rigid H-beam type structure which is resistant to any appreciable relative displacement between the engine, transmission, propeller shaft, and propeller shaft bearings. This eliminates shaft vibration and bearing damage since alignment of the propeller shaft and bearings can be continuously maintained.

It will be appreciated that the present invention provides an improved hull construction which significantly increases the propulsion efficiency of the vessel. The upper periphery 18 of the bow bulb causes oncoming water to raise and break before impacting the bow. This reduces the amount of turbulence at the bow and thus reduces resistance to vessel travel through the water.

The intensity of water resistance encountered by the propellers is increased by a number of factors including:
  (i) the rearwardly converging nature of the side skegs 36, 38 which reduces the cross-sectional area of the channels in which water flows toward the propellers, thereby increasing water velocity,
  (ii) the presence of the center skeg 40 between the side skegs which further reduces the cross-sectional area of such water channels,
  (iii) the downwardly converging sides 42, 44 of the center skeg which induce an outboard flow of water through a top segment of each propeller preferably in a direction opposite the direction of propeller rotation, and
  (iv) the configuration of the side skegs, wherein the outboard surface is generally planar and the inboard surface has an inboard extending bulb, also induces an outboard flow of water through a top segment of each propeller preferably in a direction opposite propeller rotation.

Furthermore, vibrations of the propeller shaft are minimized by the rigidified H-beam structure defined by each side skeg.

Although the present invention has been described in connection with a preferred embodiment thereof, it will be appreciated by those skilled in the art that additions, modifications, substitutions, and deletions not specifically described, may be made without departing from the spirit and scope of the invention as defined in the appended claims.

What is claimed is:

1. A seagoing vessel comprising a hull having side walls which converge forwardly to define a bow, and a forwardly projecting bulb at said bow, said bulb including an upper periphery exposed above the water surface when the vessel is stationary and in a fully loaded condition, said bulb including side walls which curve divergingly downwardly and outwardly from said upper periphery of said bulb to a location defining a maximum width of said bulb and then curve convergingly downwardly and inwardly to a bottom of said bulb, said maximum width of said bulb extending from a rear end of said bulb to a location adjacent a front end of said bulb, said bow extending downwardly and rearwardly from a deck of said vessel to a location above said bulb and then extending forwardly and downwardly to said rear end of said bulb.

2. A vessel according to claim 1, wherein said bulk is exposed to a height of at least about 1.5 feet above the water surface when the vessel is stationary and in a fully loaded condition.

3. A vessel according to claim 1, wherein said upper periphery of said bulb is oriented within a range of ±5 degrees relative to horizontal.

4. A vessel according to claim 1, wherein said upper periphery joins with a forwardly and downwardly curving front surface of said bulb, the center of curvature of said curving surface being disposed above the midpoint of the maximum height dimension of said bulb.

5. A seagoing vessel comprising a single hull, a portion of an underside of said hull being inclined upwardly and rearwardly at the stern end of the vessel, a pair of side skegs extending rearwardly from said inclined portion on opposite sides of a fore-aft center axis of the vessel such that forward ends of said skegs are disposed completely below the water line as the vessel advances, and propeller shafts extending through respective ones of said side skegs and carrying propellers at their rearward ends, said side skegs and propeller shafts converging in the rearward direction and said propellers constituting the sole propellers for propelling the vessel, said side skegs each including an outboard surface and an inboard surface, said outboard surface being generally planar and said inboard surface including an inboard projecting convex bulge at its lower end for inducing an outboard flow of water through a top segment of the associated propeller in a direction opposite the direction of propeller rotation.

6. A vessel according to claim 5, comprising a center skeg extending rearwardly from said inclined portion of said underside in a fore-aft direction midway between said side skegs, said center skeg overlapping longitudinally with at least rear portions of said side skegs, said center skeg including sides which are rearwardly diverging and downwardly converging toward a lower edge of said center skeg, said lower edge extending rearwardly and upwardly, each said side being arranged to induce an outboard flow of water through a top segment of a respective propeller in a direction opposite the direction of propeller rotation.

7. A vessel according to claim 6, wherein said lower edge of said center skeg is disposed higher than said propeller shafts at the region where said center skeg traverses a vertical plane containing said propellers.

8. A vessel according to claim 5, comprising a center skeg extending rearwardly from said inclined portion of said underside in a fore-aft direction mid-way between said side skegs, said center skeg overlapping longitudinally with at least rear portions of said side skegs and extending rearwardly at least as far as said propellers, said center skeg including rearwardly diverging sides which each induce an outboard flow of water through a top segment of a respective propeller in a direction opposite the direction of propeller rotation, said center skeg sides converging downwardly toward a bottom edge of said center skeg, said bottom edge extending rearwardly and upwardly and being disposed higher than said propeller shafts in a region where said center skeg traverses a vertical plane containing said propellers.

9. A vessel according to claim 8, wherein said sides of said center skeg are each oriented at an angle of about 45 degrees relative to vertical.

10. In a vessel according to claim 9, wherein said center skeg has a height which increases rearwardly towards a plane containing said propellers.

11. In a vessel according to claim 10, wherein each said side of said center skeg is spaced from its respective propeller by a distance of about 20 to 25 percent of the propeller diameter.

12. A vessel according to claim 5, wherein said hull has side walls which converge forwardly to define a bow, and a forwardly projecting bulb at said bow, said bulb including an upper periphery exposed above the water surface when the vessel is stationary and in a fully loaded condition, said bulb including side walls which curve divergingly downwardly and outwardly from said upper periphery of said bulb to a location defining a maximum width of said bulb and then curve convergingly downwardly and inwardly to a bottom of said bulb, said maximum width of said bulb extending from a rear end of said bulb to a location adjacent a front end of said bulb, said bow extending downwardly and rearwardly from a deck of said vessel to a location above said bulb and then extending forwardly and downwardly to said rear end of said bulb.

13. A vessel according to claim 5, wherein said vessel includes a deck, at least one bearing supporting each propeller shaft, an engine, a transmission coupled to said engine by a drive shaft and connected to a respective propeller shaft to drive the same, each side skeg comprising horizontally spaced, upright steel plates extending upwardly through and beyond the underside of said hull and to said deck, and horizontal steel cross-plating rigidly interconnecting said upright plates intermediate the height of said skeg, with said engine, transmission, and bearing being mounted upon said cross-plating.

14. A seagoing vessel comprising a hull, a portion of an underside of said hull being inclined upwardly and rearwardly at the stern end of the vessel, a pair of side skegs extending rearwardly from said inclined portion on opposite sides of a central fore-aft axis of the vessel, a pair of propeller shafts extending through respective ones of said side skegs and carrying propellers at their rearward ends, a center skeg extending rearwardly from said inclined portion of said underside in a fore-aft direction midway between said side skegs, said center skeg overlapping longitudinally with at least rear portions of said side skegs, said center skeg including rearwardly diverging sides which each induce an outboard flow of water through a top segment of a respective propeller in a direction opposite the direction of propeller rotation, said center skeg sides converging downwardly toward a bottom edge of said center skeg, said bottom edge extending rearwardly and upwardly and being disposed higher than said propeller shafts in a region where said center skeg traverses a vertical plane containing said propellers.

15. A vessel according to claim 14, wherein said side skegs each include an outboard surface and an inboard surface, said outboard surface being generally planar and said inboard surface including an inboard projecting convex bulge at its lower end for inducing an outboard flow of water through a top segment of the associated propeller in a direction opposite the direction of propeller rotation.

16. A vessel according to claim 14, wherein said center skeg has a height which increases rearwardly towards a plane containing said propellers.

17. A vessel according to claim 14, wherein each said side of said center skeg is spaced from its respective propeller by a distance of about 20 to 25 percent of the propeller diameter.

18. A vessel according to claim 14, wherein said hull has side walls which converge forwardly to define a bow, and a forwardly projecting bulb at said bow, said bulb including an upper periphery exposed above the water surface when the vessel is stationary and in a fully loaded condition, said bulb including side walls which curve divergingly downwardly and outwardly from said upper periphery of said bulb to a location defining a maximum width of said bulb and then curve convergingly downwardly and inwardly to a bottom of said bulb, said maximum width of said bulb extending from a rear end of said bulb to a location adjacent a front end of said bulb, said bow extending downwardly and rearwardly from a deck of said vessel to a location above said bulb and then extending forwardly and downwardly to said rear end of said bulb.

19. A vessel according to claim 14, wherein said vessel includes a deck, at least one bearing for supporting each propeller shaft, an engine, a transmission coupled to said engine by a drive shaft and connected to a respective propeller shaft to drive the same, each side skeg comprising horizontally spaced, upright steel plates extending upwardly through and beyond the underside of said hull and to said deck, and horizontal steel cross-plating rigidly interconnecting said upright plates intermediate the height of said skeg, with said engine, transmission, and bearing being mounted upon said cross-plating.

20. A vessel according to claim 14, wherein said side skegs converge rearwardly.

21. A seagoing vessel comprising a hull having side walls which converge forwardly to define a bow, and a forwardly projecting bulb at said bow, said bulb including an upper periphery exposed above the water surface when the vessel is stationary and in a fully loaded condition, a portion of an underside of said hull being inclined upwardly and rearwardly at the stern end of the vessel, a pair of side skegs extending rearwardly from said inclined portion on opposite sides of a fore-aft center axis of the vessel such that forward ends of said skegs are disposed completely below the water line as the vessel advances, and a pair of propeller shafts extending through respective ones of said side skegs and carrying propellers at their rearward ends, said propellers constituting the sole propellers for propelling the vessel, said side skegs and propeller shafts converging in a rearward direction, said side skegs each including an outboard surface and an inboard surface, said outboard surface being generally planar and said inboard surface including an inboard projecting convex bulge at its lower end for inducing an outboard flow of water through a top segment of the associated propeller in a direction opposite the direction of propeller rotation, a center skeg extending rearwardly from said inclined portion of said underside in a fore-aft direction midway between said side skegs, said center sket overlapping longitudinally with at least rear portions of said side skegs, said center skeg including rearwardly diverging sides which each induce an outboard flow of water through a top segment of a respective propeller in a direction opposite the direction of propeller rotation, said center skeg sides converging downwardly toward a bottom edge of said center skeg, said bottom edge extending rearwardly and upwardly and being disposed higher than said propeller shafts in a region where said center skeg traverses a vertical plane containing said propellers, said vessel including a deck and at least one bearing for supporting said propeller shaft, an engine, a transmission coupled to said engine by a drive shaft and connected to a respective propeller shaft to drive the same, each side skeg comprising horizontally spaced, upright steel plates extending upwardly through and beyond the underside of said hull and to said deck, and horizontal steel cross-plating rigidly interconnecting said upright plates intermediate the height of said skeg, with said engine, transmission, and bearing being mounted upon said cross-plating.

22. A seagoing vessel comprising a single hull, a portion of an underside of said hull being inclined upwardly and rearwardly at the stern end of the vessel, a pair of side skegs extending rearwardly from said inclined portion on opposite sides of a fore-aft center axis of the vessel such that forward ends of said skegs are disposed completely below the water line as the vessel advances, and propeller shafts extending through respective ones of said said side skegs and carrying propellers at their rearward ends, said side skegs and propeller shafts converging in the rearward direction, and said propellers constituting the sole propellers for propelling the vessel, a center skeg extending rearwardly from said inclined portion of said underside in a fore-aft direction midway between said side skegs, said center skeg overlapping longitudinally with at least rear portions of said side skegs, said center skeg including sides which are rearwardly diverging and downwardly converging toward a lower edge of said center skeg, said lower edge extending rearwardly and upwardly, each said side being arranged to induce an outboard flow of water through a top segment of a respective propeller in a direction opposite the direction of propeller rotation.

23. A seagoing vessel comprising a single hull, a portion of an underside of said hull being inclined upwardly and rearwardly at the stern end of the vessel, a pair of side skegs extending rearwardly from said inclined portion on opposite sides of a fore-aft center axis of the vessel such that forward ends of said skegs are disposed completely below the water line as the vessel advances, and propeller shafts extending through respective ones of said side skegs and carrying propellers at their rearward ends, said side skegs and propeller shafts converging in the rearward direction, and said propellers constituting the sole propellers for propelling the vessel, said hull having side walls which converge forwardly to define a bow, and a forwardly projecting bulb at said bow, said bulb including an upper periphery exposed above the water surface when the vessel is stationary and in a fully loaded condition, said bulb including side walls which curve divergingly downwardly and outwardly from said upper periphery of said bulb to a location defining a maximum width of said bulb and then curve convergingly downwardly and inwardly to a bottom of said bulb, said maximum width of said bulb extending from a rear end of said bulb to a location adjacent a front end of said bulb, said bow extending downwardly and rearwardly from a deck of said vessel to a location above said bulb and then extending forwardly and downwardly to said rear end of said bulb.

* * * * *